(12) United States Patent
Egan et al.

(10) Patent No.: US 8,396,858 B2
(45) Date of Patent: Mar. 12, 2013

(54) ADDING ENTRIES TO AN INDEX BASED ON USE OF THE INDEX

(75) Inventors: Randy L. Egan, Rochester, MN (US); Roger A. Mittelstadt, Byron, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 13/207,954

(22) Filed: Aug. 11, 2011

(65) Prior Publication Data

US 2013/0041887 A1    Feb. 14, 2013

(51) Int. Cl.
G06F 17/30    (2006.01)
(52) U.S. Cl. ......................................... 707/711
(58) Field of Classification Search .................. 707/696, 707/711, 718, 741
See application file for complete search history.

(56) References Cited

U.S. PATENT DOCUMENTS

| | | | |
|---|---|---|---|
| 4,611,272 A | 9/1986 | Lomet | |
| 5,852,821 A | 12/1998 | Chen et al. | |
| 5,852,822 A * | 12/1998 | Srinivasan et al. | 1/1 |
| 6,360,213 B1 * | 3/2002 | Wagstaff et al. | 1/1 |
| 6,859,455 B1 | 2/2005 | Yazdani et al. | |
| 7,831,587 B2 * | 11/2010 | Dymetman | 707/711 |
| 2006/0047719 A1 * | 3/2006 | Hershkovich et al. | 707/204 |
| 2010/0306222 A1 | 12/2010 | Freedman et al. | |

* cited by examiner

*Primary Examiner* — Cam-Linh Nguyen
(74) *Attorney, Agent, or Firm* — Owen J. Gamon

(57) ABSTRACT

In an embodiment, a threshold value is calculated for a current entry in a first column of an index. If the current entry has been read a number of times by execution of an execution plan that is more than the threshold value and the current entry points to at least one row in a table and not all of the at least one row have been selected by the execution plan for inclusion in a result set as satisfying a query that the execution plan implements, then a new entry is added to the index.

19 Claims, 8 Drawing Sheets

ADDING ENTRIES TO AN INDEX BASED ON USE OF THE INDEX

FIELD

An embodiment of the invention generally relates to computer systems and more particularly to computer systems that access data in a database via an index.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader of the page on which a given word appears.

One way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index or indexes, the type and contents of the index(es) to build, whether to use a temporary file to execute a sort, and/or the order in which the tables are to be joined together to satisfy the query. When taken together, these internal steps are referred to as an execution plan. The DBMS often saves the execution plan and reuses it when the user or requesting program repeats the query, which is a common occurrence, instead of undergoing the time-consuming process of recreating the execution plan.

Many different execution plans may be created for any one query, each of which would return the same data set that satisfies the query, yet the different execution plans may provide widely different performance. Thus, the execution plan selected by the DBMS needs to provide the required data at a reasonable cost in terms of time and hardware resources. One factor that contributes to the cost of a particular execution plan is the type of index or indexes that the execution plan specifies.

SUMMARY

A method, computer-readable storage medium, and computer system are provided. In an embodiment, a threshold value is calculated for a current entry in a first column of an index. If the current entry has been read a number of times by execution of an execution plan that is more than the threshold value and the current entry points to at least one row in a table and not all of the at least one row have been selected by the execution plan for inclusion in a result set as satisfying a query that the execution plan implements, then a new entry is added to the index.

It is to be noted, however, that the appended drawings illustrate only example embodiments of the invention, and are therefore not considered a limitation of the scope of other embodiments of the invention.

DETAILED DESCRIPTION

Figure 1:
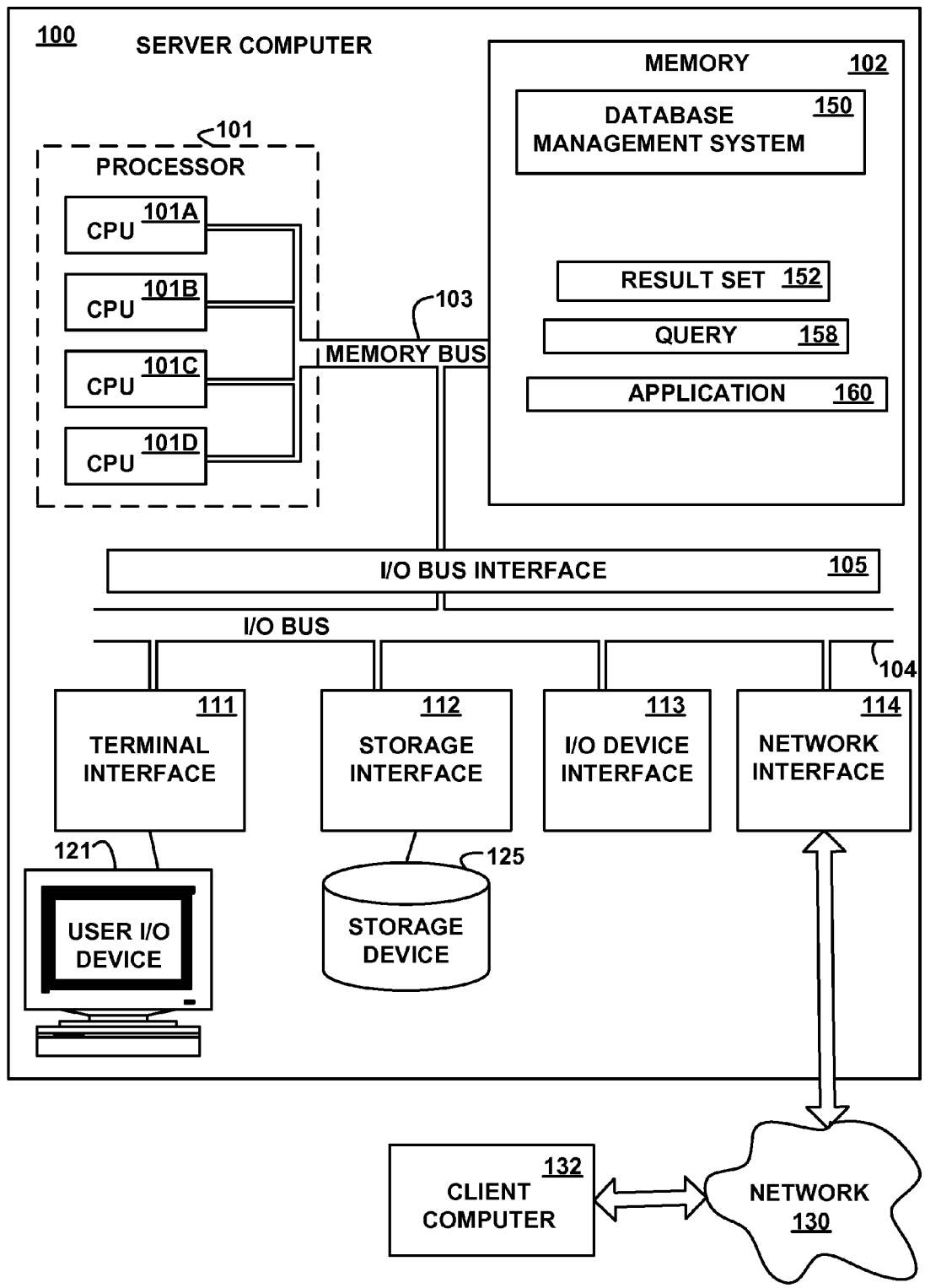
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a database management system 150, a result set 152, a query 158, and an application 160. Although the database management system 150, the result set 152, the query 158, and the application 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 150, the result set 152, the query 158, and the application 160 are illustrated as being contained within the main memory 102, these elements are not necessarily all completely contained in the same storage device at the same time. Further, although the database management system 150, the result set 152, the query 158, and the application 160 are illustrated as being separate entities, in other embodiments some of them, portions of some of them, or all of them may be packaged together.

In an embodiment, the database management system 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In another embodiment, the database management system 150 and/or the application 160 are implemented in hardware via semiconductor devices, chips, logical gates, circuits, circuit cards, and/or other physical hardware devices in lieu of, or in addition to, a processor-based system. In an embodiment, the database management system 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
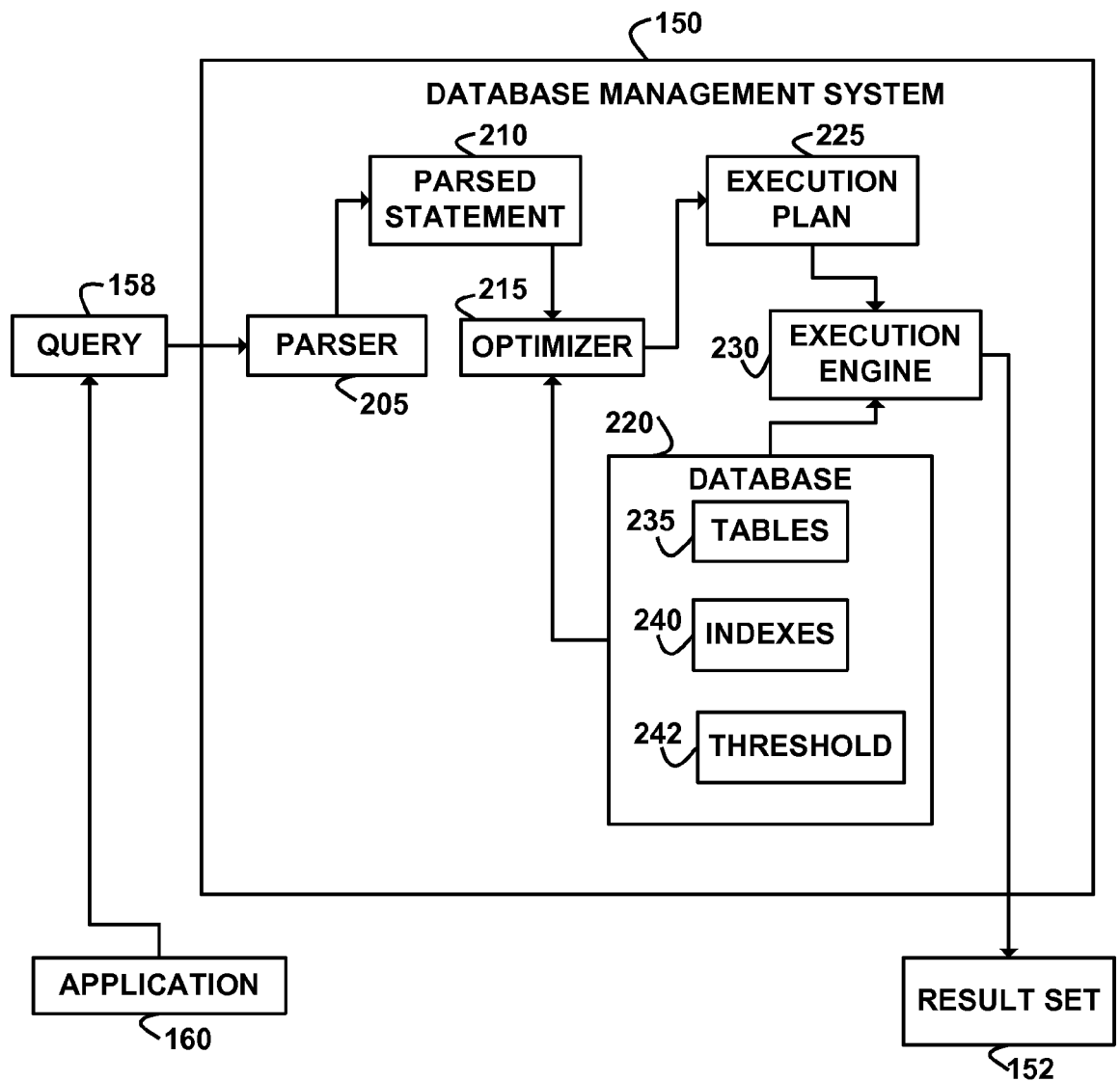
FIG. 2 depicts a block diagram of an example database management system, according to an embodiment of the invention.

FIG. 2 depicts a block diagram of an example database management system 150, according to an embodiment of the invention. The database management system 150 comprises a parser 205, an optimizer 215, an execution engine 230, and a database 220. The database 220 comprises tables 235, one or more indexes 240, and one or more thresholds 242. The tables 235 organizes data in rows, which represent individual entries, tuples, or records and columns, fields, or attributes, which define what is stored in each row, entry, tuple, or record. Each table 235 has a unique name within the database 220, and each column has a unique name within the particular table 235. The indexes 240 are data structures that inform the database management system 150 of the location of a certain row in a table 235 given an indexed column value.

The parser 205 in the database management system 150 receives the query 158 from the application 160. The query 158 requests that the database management system 150 search for or find a row or combination of rows of data and store the data from those found rows into the result set 152 that meet or satisfy the criteria, keys, and or values specified by the query 158. In an embodiment, the application 160 sends the same query 158 multiple times to the database management system 150, which may or may not result in a different result set 152, depending, e.g., on whether the data in the database management system 150 has changed between occurrences of the query 158 or whether the query contains input variables or host variables whose values may change. The parser 205 generates a parsed statement 210 from the query 158, which the parser 205 sends to the optimizer 215. The optimizer 215 performs query optimization on the parsed statement 210. As a result of the query optimization, the optimizer 215 generates one or more execution plans 225, using data such as platform capabilities, query content information, etc., that is stored in the database 220. The optimizer 215 or a user such as a database administrator may create the indexes 240 and add entries to the indexes 240 and/or delete entries from the indexes 240 based on the thresholds 242. In various embodiments, some or all of the indexes 240 may have the same or different thresholds 242. The optimizer 215 may store information into the execution plan 225 that specifies which of the indexes 240 to use during execution of the execution plan 225.

Once generated, the optimizer 215 sends the execution plan 225 to the execution engine 230, which executes the query 158 using the execution plan 225, and the indexes 240, in order to find and retrieve the data in the database tables 235 in the database 220 that satisfies the criteria of the query 158. The execution engine 230 stores the resultant data that satisfies the criteria specified by the query 158 into the result set 152, which is returned to the application 160 as a response to the query 158. In an embodiment, the database management system 150 stores various thresholds into the execution plan 225. The database management system 150 may receive the various thresholds from the application 160, from a user, or from a database administrator, or the thresholds may be set by a designer of the optimizer 215 or calculated by the optimizer 215.

Figure 3:
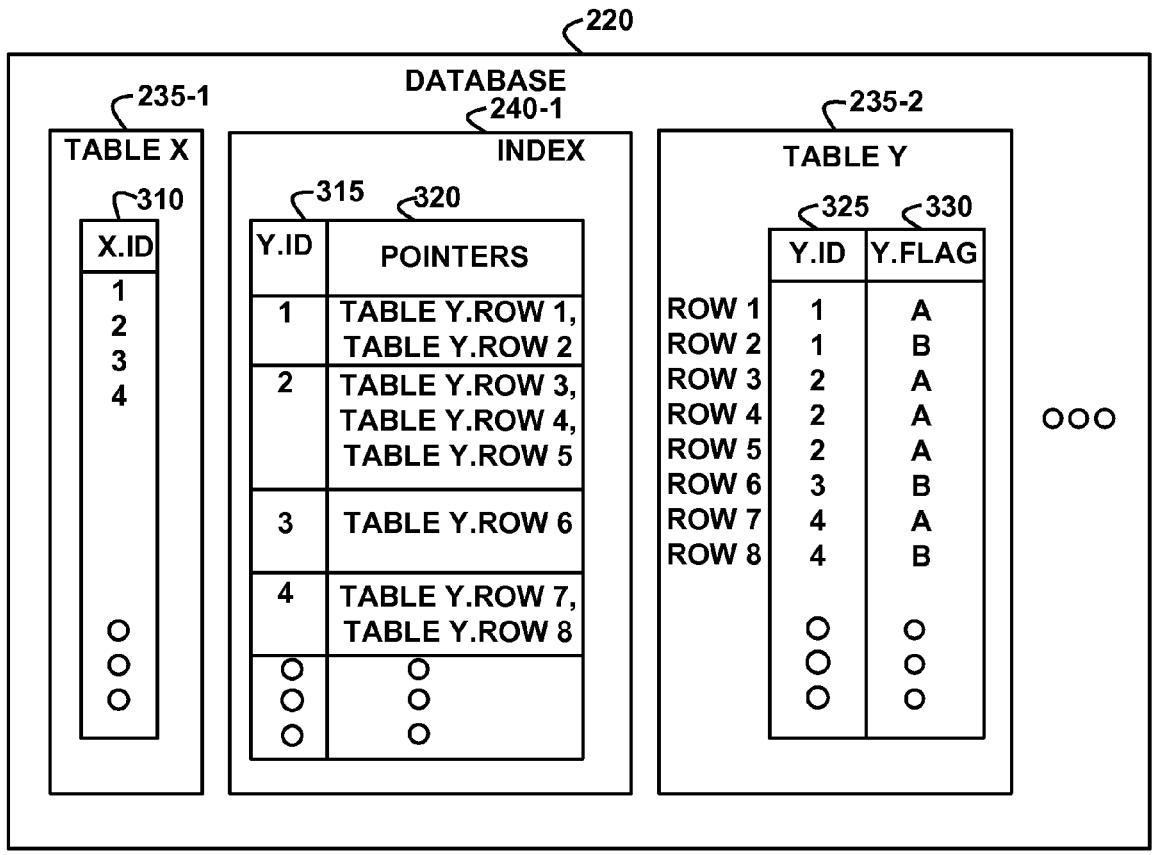
FIG. 3 depicts a block diagram of an example data structure for a database, according to an embodiment of the invention.

FIG. 3 depicts a block diagram of an example data structure for a database 220, according to an embodiment of the invention. The example database 220 comprises an example table x 235-1, an example table y 235-2, and an example index 240-1. The table x 235-1 is an example of, and is generically referred to by, the table 235 (FIG. 2). The table y 235-2 is an example of, and is generically referred to by, the table 235 (FIG. 2). The index 240-1 is an example of, and is generically referred to by, the index 240 (FIG. 2).

The table x 235-1 comprises the column x.ID 310. The table y 235-2 comprises the column y.ID 325 and the column y.flag 330. The index 240-1 comprises the column y.ID 315 and the column pointers 320. The columns 315 and 325 share the same column name or identifier "Y.ID."

Each table 235-1 and 235-2 in the example database 220 is divided into rows and columns. The example table x 235-1 comprises a first row with a value of "1" stored in the column x.ID 310; a second row with a value of "2" stored in the column x.ID 310; a third row with a value of "3" stored in the column x.ID 310, and a fourth row with a value of "4" stored in the column x.ID 310, etc.

The example table y 235-2 comprises a first row with a value of "1" stored in the column y.ID 325 and a value of "A" stored in the column y.flag 330; a second row with a value of "1" stored in the column y.ID 325 and a value of "B" stored in the column y.flag 330; a third row with a value of "2" stored in the column y.ID 325 and a value of "A" stored in the column y.flag 330; a fourth row with a value of "2" stored in the column y.ID 325 and a value of "A" stored in the column y.flag 330; a fifth row with a value of "2" stored in the column y.ID 325 and a value of "A" stored in the column y.flag 330; a sixth row with a value of "3" stored in the column y.ID 325 and a value of "B" stored in the column y.flag 330; a seventh row with a value of "4" stored in the column y.ID 325 and a value of "A" stored in the column y.flag 330; an eighth row with a value of "4" stored in the column y.ID 325 and a value of "B" stored in the column y.flag 330; etc.

The table y 235-2 illustrates row identifiers ("row 1," "row 2," "row 3," etc.), which identify the respective rows in the table y 235-2. In another embodiment, the row identifiers are addresses (either absolute, relative, physical, logical, or virtual addresses) that identify the storage location of the respective row. In an embodiment, the row identifiers are pointed to by addresses or identifiers in the index 240. In another embodiment, the row identifiers are unique values in a column. Row identifiers exist for all of the tables and rows.

The index 240-1 comprises a column y.ID 315 and a pointers column 320. The index 240-1 comprises a first entry with a value of "1" stored in the column y.ID 315 and a value of "table y.row 1, table y.row 2" stored in the column pointers 320, which point at (are the addresses of) row 1 of the table y 235-2 and row 2 of the table y 235-2, respectively. Thus, in response to receiving a value of "1" that matches the value of "1" in the column y.ID 315 of the first entry of the index 240-1, the index 240-1 finds and returns a pointer to the first row of the table y 235-2 and a pointer to the second row of the table y 235-2, which both contain the value "1" in the column y.ID 325, which match (are identical to) the value of "1" that was received by the index 240-1.

The index 240-1 further comprises a second entry with a value of "2" stored in the column y.ID 315 and a value of "table y.row 3, table y.row 4, table y.row 5" stored in the column pointers 320, which point at (are the addresses of) row 3, row 4, and row 5, respectively, of the table y 235-2. Thus, in response to receiving a value of "2" that matches the value of "2" in the column y.ID 315 of the second entry of the index 240-1, the index 240-1 finds and returns a pointer to the third row of the table y 235-2, a pointer to the fourth row of the table y 235-2, and a pointer to the fifth row of the table y 235-2, which all contain the value "2" in the column y.ID 325, which match (are identical to) the value of "2" that was received by the index 240-1.

The index 240-1 further comprises a third entry with a value of "3" stored in the column y.ID 315 and a value of "table y.row 6" stored in the column pointers 320, which points at row 6 of the table y 235-2. Thus, in response to receiving a value of "3" that matches the value of "3" in the column y.ID 315 of the third entry of the index 240-1, the index 240-1 finds and returns a pointer to the sixth row of the table y 235-2, which is the only row in the table y 235-2 that contains the value "3" in the column y.ID 325, which matches (is identical to) the value of "3" that was received by the index 240-1.

The index 240-1 further comprises a fourth entry with a value of "4" stored in the column y.ID 315 and a value of "table y.row 7" and "table y.row 8" stored in the column pointers 320, which point at row 7 and row 8, respectively, of the table y 235-2. Thus, in response to receiving a value of "4" that matches the value of "4" in the column y.ID 315 of the fourth entry of the index 240-1, the index 240-1 finds and returns a pointer to the seventh row and the eighth row of the table y 235-2, which are the only rows in the table y 235-2 that contain the value "4" in the column y.ID 325, which match (are identical to) the value of "4" that was received by the index 240-1.

Consider an example query: "Select * from table x inner join table y on x.id=y.id where y.flag='A' and y.id !=4." Using the index 240-1 of FIG. 3, the execution engine 230 submits the value of "1" for y.id to the index 240-1, which returns the pointers of table y.row 1 and table y.row 2. The execution engine 230 then uses these pointers to read row 1 and row 2 from the table 235-2, in order to discover that y.flag="A" in row 1 of the table y 235-2 and thus satisfies the query and to discover that y.flag="B" in row 2 of the table y 235-2 and thus does not satisfy the query. Thus, the execution engine 230 performs two reads of the table 235-2 while processing the value of y.id="1" from the index 240-1.

Figure 4:
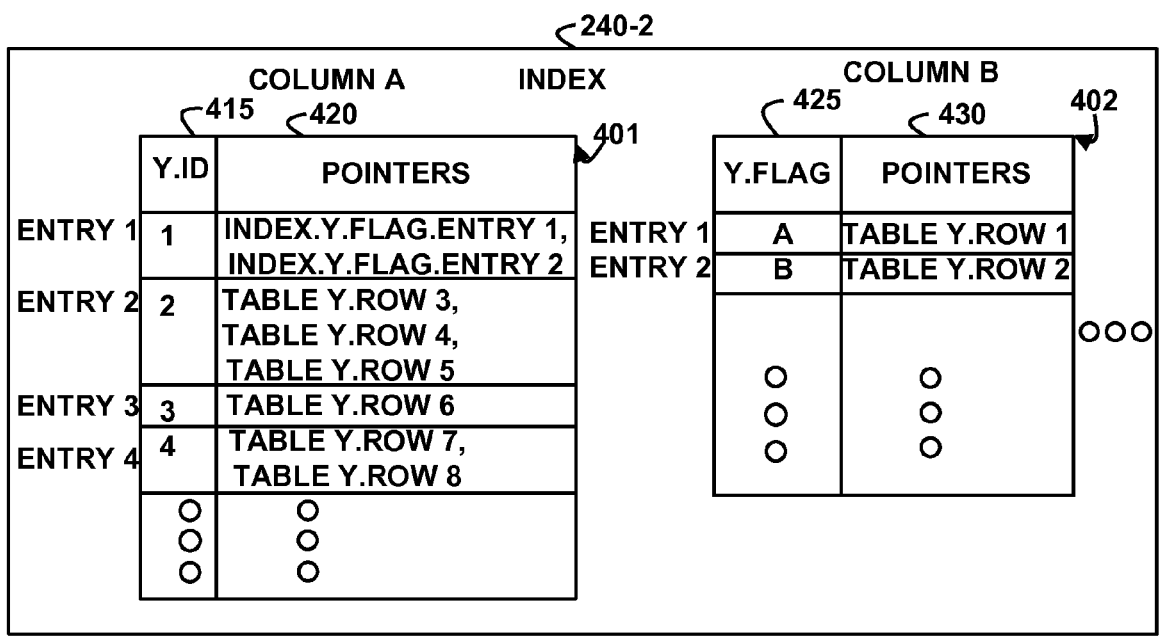
FIG. 4 depicts a block diagram of an example data structure for an index, according to an embodiment of the invention.

FIG. 4 depicts a block diagram of an example data structure for an index 240-2, according to an embodiment of the invention. The index 240-2 is an example of, and is generically referred to by, the index 240 (FIG. 2). The index 240-2 comprises any number of columns, such as the column A 401 and the column B 402. The column A 401 comprises a y.ID column 415 and a pointers column 420. The column B 402 comprises a y.flag column 425 and a pointers column 430.

The column A 401 in the index 240-2 comprises a first entry with a value of "1" stored in the column y.ID 415 and a value of "index.y.flag.entry 1, index.y.flag.entry 2" stored in the column pointers 420, which point at (are the addresses of) the entry 1 of column B 402 and the entry 2 of the column B 402, respectively. Thus, in response to receiving a value of "1" that matches the value of "1" in the column y.ID 415 of the first entry of the column A 401 of the index 240-2, the index 240-2 finds and returns a pointer to the first entry of the column B 402 of the index 240-2 and a pointer to the second entry of the column B 402 of the index 240-2.

The column A 401 in the index 240-2 further comprises a second entry with a value of "2" stored in the column y.ID 415 and a value of "table y.row 3, table y.row 4, table y.row 5" stored in the column pointers 420, which point at (are the addresses of) row 3, row 4, and row 5, respectively, of the table y 235-2 (FIG. 3). Thus, in response to receiving a value of "2" that matches the value of "2" in the column y.ID 415 of the second entry of the index 240-2, the index 240-2 finds and returns a pointer to the third row of the table y 235-2, a pointer to the fourth row of the table y 235-2, and a pointer to the fifth row of the table y 235-2, which all contain the value "2" in the column y.ID 325, which match (are identical to) the value of "2" that was received by the index 240-2.

The column A 401 in the index 240-2 further comprises a third entry with a value of "3" stored in the column y.ID 415 and a value of "table y.row 6" stored in the column pointers 420, which points at row 6 of the table y 235-2. Thus, in response to receiving a value of "3" that matches the value of "3" in the column y.ID 415 of the third entry of the index 240-2, the index 240-2 finds and returns a pointer to the sixth row of the table y 235-2, which is the only row in the table y 235-2 that contains the value "3" in the column y.ID 325, which matches (is identical to) the value of "3" that was received by the index 240-2.

The column A 401 in the index 240-2 further comprises a fourth entry with a value of "4" stored in the column y.ID 415 and a value of "table y.row 7" and "table y.row 8" stored in the column pointers 420, which point at row 7 and row 8, respectively, of the table y 235-2. Thus, in response to receiving a value of "4" that matches the value of "4" in the column y.ID 415 of the fourth entry of the index 240-2, the index 240-2 finds and returns a pointer to the seventh row and the eighth row of the table y 235-2, which are the only rows in the table y 235-2 that contain the value "4" in the column y.ID 325, which match (are identical to) the value of "4" that was received by the index 240-2.

The column B 402 in the index 240-2 comprises a first entry with a value of "A" stored in the column y.flag 425 and a value of "table y.row 1" stored in the column pointers 430, which points at (is the addresses of) the first row in the table y 235-2 (FIG. 3). Thus, in response to receiving a value of "A" that matches the value of "A" in the column y.ID 425 of the first entry of the column B 402 of the index 240-2, the index 240-2 finds and returns a pointer to the first row in the table y 235-2.

The column B 402 in the index 240-2 further comprises a second entry with a value of "B" stored in the column y.flag 425 and a value of "table y.row 2" stored in the column pointers 430, which points at (is the addresses of) the second row in the table y 235-2 (FIG. 3). Thus, in response to receiving a value of "B" that matches the value of "B" in the column y.ID 425 of the second entry of the column B 402 of the index 240-2, the index 240-2 finds and returns a pointer to the second row in the table y 235-2.

Entries in columns in the index 240-2 that point to rows in the table Y 235-2 are referred to as leaves (terminal entries) of the index 240-2. For example, the entry 2, the entry 3, and the entry 4 in the column A 401 and the entry 1 and the entry 2 in the column B 402 are leaves because their respective pointers fields 420 and 430 contain the addresses of rows in the table Y 235-2. Entries in the columns of the index 240-2 that point to other entries in the index 240-2 are not leaves (are non-terminal entries). For example, the entry 1 in the column A 401 in the index 240-2 is not a leaf because its pointer 420 contains the addresses of entries in the column B 402 of the index 240-2.

Consider an example query: "Select * from table x inner join table y on x.id=y.id where y.flag='A' and y.id !=4." If this example query is received by the database management system 150 and executed more than a threshold number of times using the index 240-1 of FIG. 3, then the database management system 150 changes the index 240-1 of FIG. 3 into the index 240-2 of FIG. 4 by adding the entries to the column B 402. If the execution plan 225 that implements this example query then uses the index 240-2 of FIG. 4, the execution engine 230 submits the value of "1" for y.id to the index 240-2, which returns the pointers of index.y.flag.entry 1 and index.y.flag.entry 2. The execution engine 230 then uses these pointers to read the entry 1 and the entry 2 from the column B 402 of the index, in order to discover that y.flag 425="A" in the entry 1 of the column 402 and thus satisfies the query and to discover that y.flag 425="B" in the entry 2 of the column 402 and thus does not satisfy the query. Thus, the execution engine 230 performs two reads of the column 402 in the index while processing the value of y.id="1" from the column 401 of the index 240-2 instead of performing two reads of the table 235-2, as was done using the example index 240-1 of FIG. 3. In an embodiment, the execution engine 230 performs two reads of the column 402 in the index and one read of the row 1 of the table 235-2, in order to read all columns that may be present in the row 1 of the table 235-2. Thus, the performance of the execution of the query using the index 240-2 is increased over the performance using the index 240-1 if the indexes are in storage that has a faster access time that the storage that stores the table 235-2.

Figure 5:
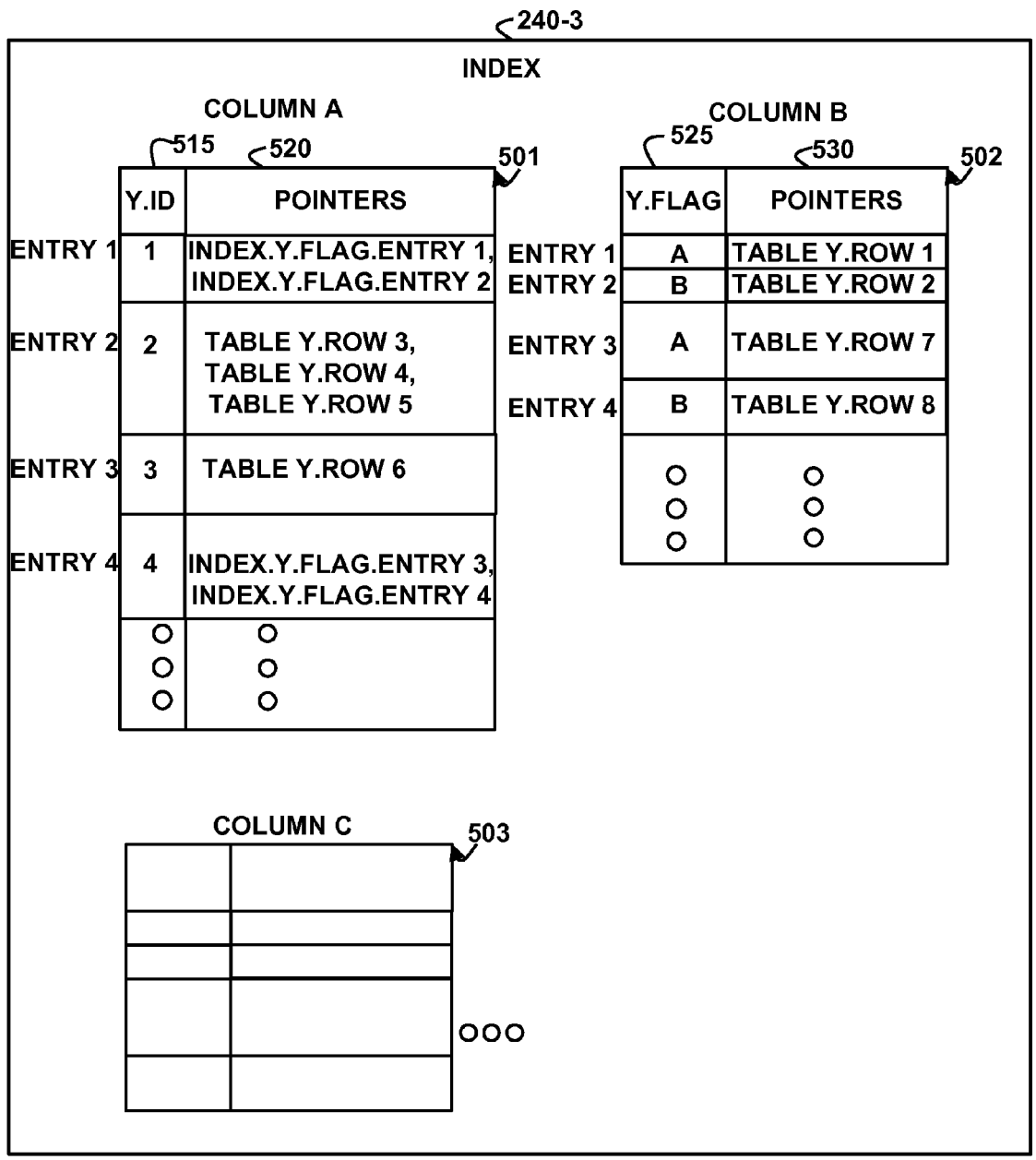
FIG. 5 depicts a block diagram of an example data structure for an index, according to an embodiment of the invention.

FIG. 5 depicts a block diagram of an example data structure for an index 240-3, according to an embodiment of the invention. The index 240-3 is an example of, and is generically referred to by, the index 240 (FIG. 2). The index 240-3 comprises any number of columns, such as the column A 501 and the column B 502 and the column C 503. The column A 501 comprises a y.ID column 515 and a pointers column 520. The column B 502 comprises a y.flag column 525 and a pointers column 530.

The column A 501 in the index 240-3 comprises a first entry with a value of "1" stored in the column y.ID 515 and a value of "index.y.flag.entry 1, index.y.flag.entry 2" stored in the column pointers 520, which point at (are the addresses of) the entry 1 of column B 502 and the entry 2 of the column B 502, respectively. Thus, in response to receiving a value of "1" that matches the value of "1" in the column y.ID 515 of the first entry of the column A 501 of the index 240-3, the index 240-3 finds and returns a pointer to the first entry of the column B 502 of the index 240-3 and a pointer to the second entry of the column B 502 of the index 240-3.

The column A 501 in the index 240-3 further comprises a second entry with a value of "2" stored in the column y.ID 515 and a value of "table y.row 3, table y.row 4, table y.row 5" stored in the column pointers 520, which point at (are the addresses of) row 3, row 4, and row 5, respectively, of the table y 235-2 (FIG. 3). Thus, in response to receiving a value of "2" that matches the value of "2" in the column y.ID 515 of the second entry of the index 240-3, the index 240-3 finds and returns a pointer to the third row of the table y 235-2, a pointer to the fourth row of the table y 235-2, and a pointer to the fifth row of the table y 235-2, which all contain the value "2" in the column y.ID 325, which match (are identical to) the value of "2" that was received by the index 240-3.

The column A 501 in the index 240-3 further comprises a third entry with a value of "3" stored in the column y.ID 515 and a value of "table y.row 6" stored in the column pointers 520, which points at (contains the address of) row 6 of the table y 235-2. Thus, in response to receiving a value of "3" that matches the value of "3" in the column y.ID 515 of the third entry of the index 240-3, the index 240-3 finds and returns a pointer to the sixth row of the table y 235-2, which is the only row in the table y 235-2 that contains the value "3" in the column y.ID 325, which matches (is identical to) the value of "3" that was received by the index 240-3.

The column A 501 in the index 240-3 further comprises a fourth entry with a value of "4" stored in the column y.ID 515 and a value of "index.y.flag.entry 3, index.y.flag.entry 4" stored in the column pointers 520, which point at (contain the address of) the entry 3 and the entry 4 of the column B 502 in the index 240-3. Thus, in response to receiving a value of "4" that matches the value of "4" in the column y.ID 515 of the fourth entry of the column A 501 of the index 240-3, the index 240-3 finds and returns pointers to the third entry and the fourth entry of the column B 502 of the index 240-3.

The column B 502 in the index 240-3 comprises a first entry with a value of "A" stored in the column y.flag 525 and a value of "table y.row 1" stored in the column pointers 530, which points at (is the address of) the first row in the table y 235-2 (FIG. 3). The column B 502 in the index 240-3 further comprises a second entry with a value of "B" stored in the column y.flag 525 and a value of "table y.row 2" stored in the column pointers 530, which points at (is the address of) the second row in the table y 235-2 (FIG. 3). The column B 502 in the index 240-3 further comprises a third entry with a value of "A" stored in the column y.flag 525 and a value of "table y.row 7" stored in the column pointers 530, which points at (is the address of) the seventh row in the table y 235-2 (FIG. 3). The column B 502 in the index 240-3 further comprises a fourth entry with a value of "B" stored in the column y.flag 525 and a value of "table y.row 8" stored in the column pointers 530, which points at (is the address of) the eighth row in the table y 235-2 (FIG. 3).

Thus, in response to receiving a value of "A" that matches the value of "A" in the column y.ID 525 of the first entry and the third entry of the column B 502 of the index 240-3, the index 240-3 finds and returns pointers to the first row and the seventh row in the table y 235-2. Further, in response to receiving a value of "B" that matches the value of "B" in the column y.ID 525 of the second entry and the fourth entry of the column B 502 of the index 240-3, the column B 502 of the index 240-3 finds and returns pointers to the second row and the eighth row in the table y 235-2.

Entries in columns in the index 240-3 that point to rows in the table Y 235-2 are referred to as leaves (terminal entries) of the index. For example, the entry 2 and the entry 3 in the column A 501 and the entry 1, the entry 2, the entry 3, and the entry 4 in the column B 502 are leaves because their respective pointers fields 520 and 530 contain the addresses of rows in the table Y 235-2. Entries in the columns of the index 240-3 that point to other entries in the index 240-3 are not leaves (are non-terminal entries). For example, the entry 1 and the entry 4 in the column A 501 in the index 240-3 are not leaves because their pointers 520 contain the addresses of entries in the column B 502 of the index 240-3.

Consider an example query: "Select * from table x inner join table y on x.id=y.id where y.flag='A' and y.id=4." If this example query is received by the database management system 150 and executed more than a threshold number of times, the database management system 150 changes the index 240-2 of FIG. 4 into the index 240-3 of FIG. 5 by modifying the fourth entry in the column A 501 and adding the third and fourth entries in the column B 502. Using the index 240-3 of FIG. 5, the execution engine 230 submits the value of "4" for y.id to the index 240-3, which returns the pointers of index.y-.flag.entry 3 and index.y.flag.entry 4. The execution engine 230 then uses these pointers to read the entry 3 and the entry 4 from the column 502 of the index 240-3, in order to discover that y.flag 525="A" in the entry 3 of the column 502 of the index 240-3 and thus satisfies the query and to discover that y.flag 525="B" in the entry 4 of the column 502 and thus does not satisfy the query. Thus, the execution engine 230 performs two reads of the column 502 in the index 240-3 while processing the value of y.id="4" from the column 501 of the index 240-3 instead of performing two reads of the table 235-2, as was done using the example index 240-1 of FIG. 3. In an embodiment, the execution engine 230 performs two reads of the column 502 in the index and one read of the row 7 of the table 235-2, in order to read all columns that may be present in the row 7 of the table 235-2. Thus, the performance of the execution of the query using the index 240-3 is increased over the performance using the index 240-1 and 240-2 (for the example query) if the indexes are in storage that has a faster access time that the storage that stores the table 235-2.

Figure 6:
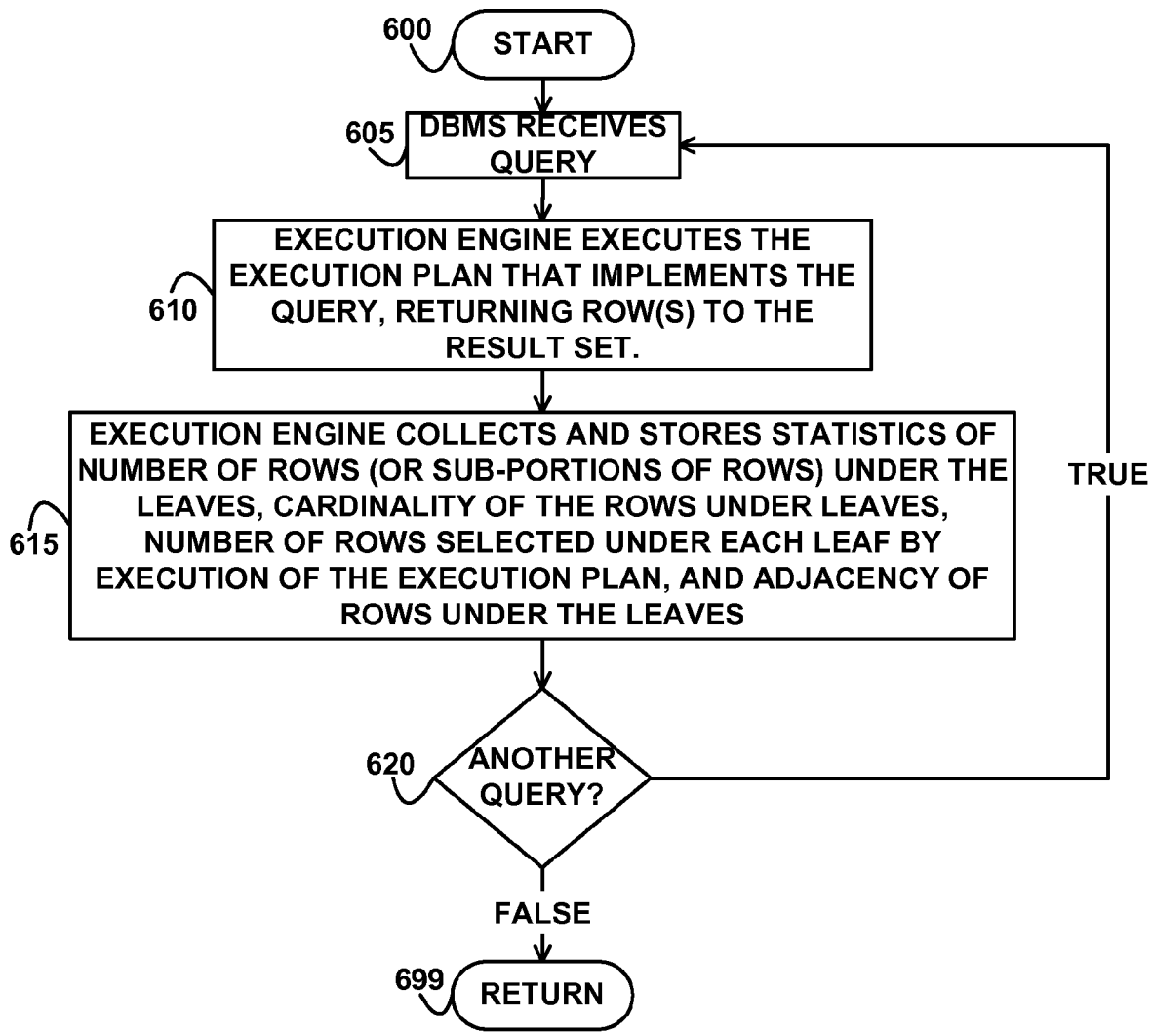
FIG. 6 depicts a flowchart of example processing for executing an execution plan for a query, according to an embodiment of the invention.

FIG. 6 depicts a flowchart of example processing for executing an execution plan for a query, according to an embodiment of the invention. Control begins at block 600. Control then continues to block 605 where the database management system 150 receives a query 158 from the application 160. Control then continues to block 610 where, in response to receiving the query 158, the execution engine 230 finds and executes the execution plan 225 that implements the query 158, returning and/or storing one or more rows that satisfy the query 158 to the result set 152. Control then continues to block 615 where the execution engine 230 collects and stores statistics (into the execution plan 225 or to the index 240) of the number of rows (or sub-portions of rows) under the leaves of the index 240 that executed by the execution engine 230, the cardinality of the rows under the leaves of the index 240, the number of rows selected under each leaf by the execution of the execution plan 225, the adjacency of the rows under the leaves of the index 240, and/or the number of physical sectors or pages that must be read from a storage device that stores the database.

Control then continues to block 620 where the execution engine 230 determines whether another query 158 exists. If the determination at block 620 is true, then another query 158 exists, so control returns to block 605 where the database management system 150 receives the same or a different query 158 from the same or a different application. Control then continues to block 610, as previously described above.

If the determination at block 620 is false, then another query 158 does not exist, so control continues to block 699 where the execution of the execution engine 230 returns.

Figure 7:
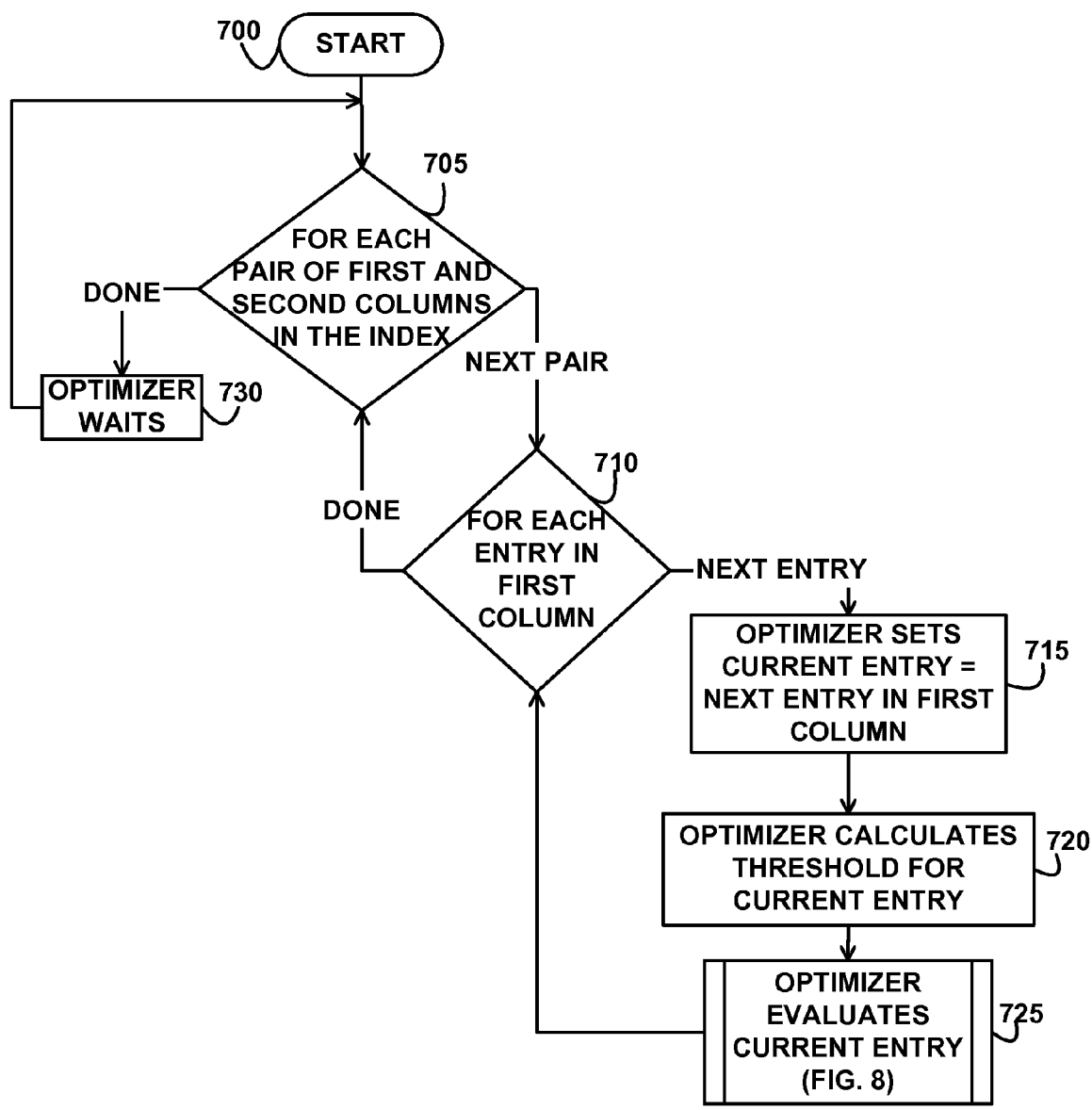
FIG. 7 depicts a flowchart of example processing for evaluating an index, according to an embodiment of the invention.

FIG. 7 depicts a flowchart of example processing for evaluating an index, according to an embodiment of the invention. Control begins at block 700. Control then continues to block 705 where the optimizer 215 reads and considers, in turn during each successive iteration of the loop that starts at block 705, each pair of first and second columns in the index 240. Using the example of FIG. 5, the column A 501 and the column B 502 are a pair of first and second columns in the index 240-3; the column A 501 and the column C 503 are another pair of first and second columns; and the column B 502 and the column C 503 are another pair of first and second columns. So long as a pair of first and second columns in the index 240 exists that has not been read and considered by the loop that starts at block 705, the optimizer 215 continues from block 705 to block 710 for the next pair of first and second columns.

At block 710, the optimizer 215 reads and considers, in turn during each successive iteration of the loop that starts at block 710, each entry in the first column of the index 240. So long as an entry exists in the first column of the index 240 that has not been read and considered by the loop that starts at block 710, the optimizer 215 continues from block 710 for the next entry to block 715 where the optimizer 215 sets the current entry in the first column of the index 240 to be the next entry in the first column of the index 240.

Control then continues to block 720 where the optimizer 215 calculates the threshold value 242 for current entry in the first column of the index 240. In various embodiments, each entry or each leaf may have the same or a different threshold value 242. The optimizer 215 calculates the threshold value 242 based on any, some, or all of criteria of: the adjacency of rows in the table 235, the cardinality of rows (or subportions of rows) in the table 235 under leaves of the index 240, the number of rows in the table 235, the uniqueness of data in rows in the table 235, and/or the number of rows selected for inclusion in the result set 152, as further explained below. In an embodiment, the optimizer 215 combines the criteria using respective weights for each criteria.

The optimizer 215 calculates a selectivity percentage to be the number of rows under a leaf that are selected for inclusion in the result set 152 divided by the total number of rows under the leaf in the table 235. In an embodiment, the optimizer 215 modifies the threshold 242 in proportion to the selectivity percentage, such as the smaller the percentage, the smaller the threshold 242, and thus the more likely that the optimizer 215 adds an entry to a column in the index 240. The larger the selectivity percentage, the larger the threshold 242 and the less likely that the optimizer adds an entry to a column in the index 240. The optimizer 215 uses the selectivity percentage because the smaller the selectivity percentage, the more reads to the table can be avoided while executing future queries, and the larger the selectivity percentage, the fewer reads to the table that may be avoided by adding an entry to the index 240. A larger threshold value is more than a smaller threshold value, and a larger selectivity percentage is more than a smaller threshold percentage.

The optimizer 215 calculates the uniqueness of the current entry in the index 240, meaning the number of rows in the table to which the pointers of the current entry point, and modifies the threshold 242 in proportion to the number of rows in the table pointed to by the current entry. Thus, for entries that are closer to being unique (i.e. the fewer the number of rows that are pointed to by the current entry), the greater the threshold 242 is that the optimizer 215 calculates and the less likely the optimizer 215 is to add an entry to the index 240. Further, for entries that are farther from being unique (the more rows that are pointed to by the current entry), the smaller the threshold 242 is that the optimizer 215 calculates and the more likely the optimizer 215 is to add an entry to the index 240. A larger threshold value is more than a smaller threshold value, and a larger number of rows is more than a smaller number of rows.

In an embodiment, the optimizer 215 calculates adjacency for the current entry to be the difference in the values of the pointers (the addresses) in the current entry. In another embodiment, the optimizer 215 calculates the adjacency based on a maximum value of the pointer values or the standard deviation of the pointer values.

In an embodiment, the optimizer 215 modifies the threshold 242 in proportion to the adjacency as follows. If a smaller average difference exists between the locations (addresses) of the rows in the table pointed to by the current entry, then the rows are closer together in storage and thus more likely that those rows are on the same storage pages, so less benefit may be derived from the optimizer 215 adding more entries to the index 240, so the optimizer 215 sets the threshold 242 to be a larger value. If a larger average distance exists between locations (addresses) of the rows in the table pointed to by the current entry, then the rows are farther apart in storage and thus less likely that the rows are on the same physical storage pages, so more benefit may be derived from the optimizer 215 adding more entries to the index 240, so the optimizer 215 sets the threshold 242 to be a smaller value.

In an embodiment, the optimizer 215 sets the threshold 242 in proportion to the cardinality of the columns pointed to by pointers of the current entry in the index 240. The cardinality of a column is the number of unique values in the rows of the column. If the cardinality of the columns pointed to by the pointers in the current index 240 is larger, the optimizer 215 sets the threshold 242 to be a smaller value, in order to cause a larger likelihood that the optimizer 215 adds additional entries to the index 240. If the cardinality of the columns is smaller, the optimizer 215 sets the threshold 242 to be a larger value, in order to cause a smaller likelihood that the optimizer 215 adds additional entries to the index 240.

In an embodiment, the threshold 242 is greater than or equal to one, meaning that the optimizer 215 only adds those values to the index 240 that execution of the execution plan 225 has read from the table.

Control then continues to block 725 where the optimizer 215 evaluates the current entry in the first column, as further described below with reference to FIG. 8. Control then returns to block 710, as previously described above.

In response to all entries in the first column having been read and considered by the logic of the loop that starts at block 710, control continues from block 710 to block 705, as previously described above.

In response to all of the pairs of first and second columns in the index 240 having been read and considered by the loop that starts at block 705, control continues from block 705 to block 730 where the optimizer 215 waits for a period of time. Control then returns to block 705, as previously described above.

Figure 8:
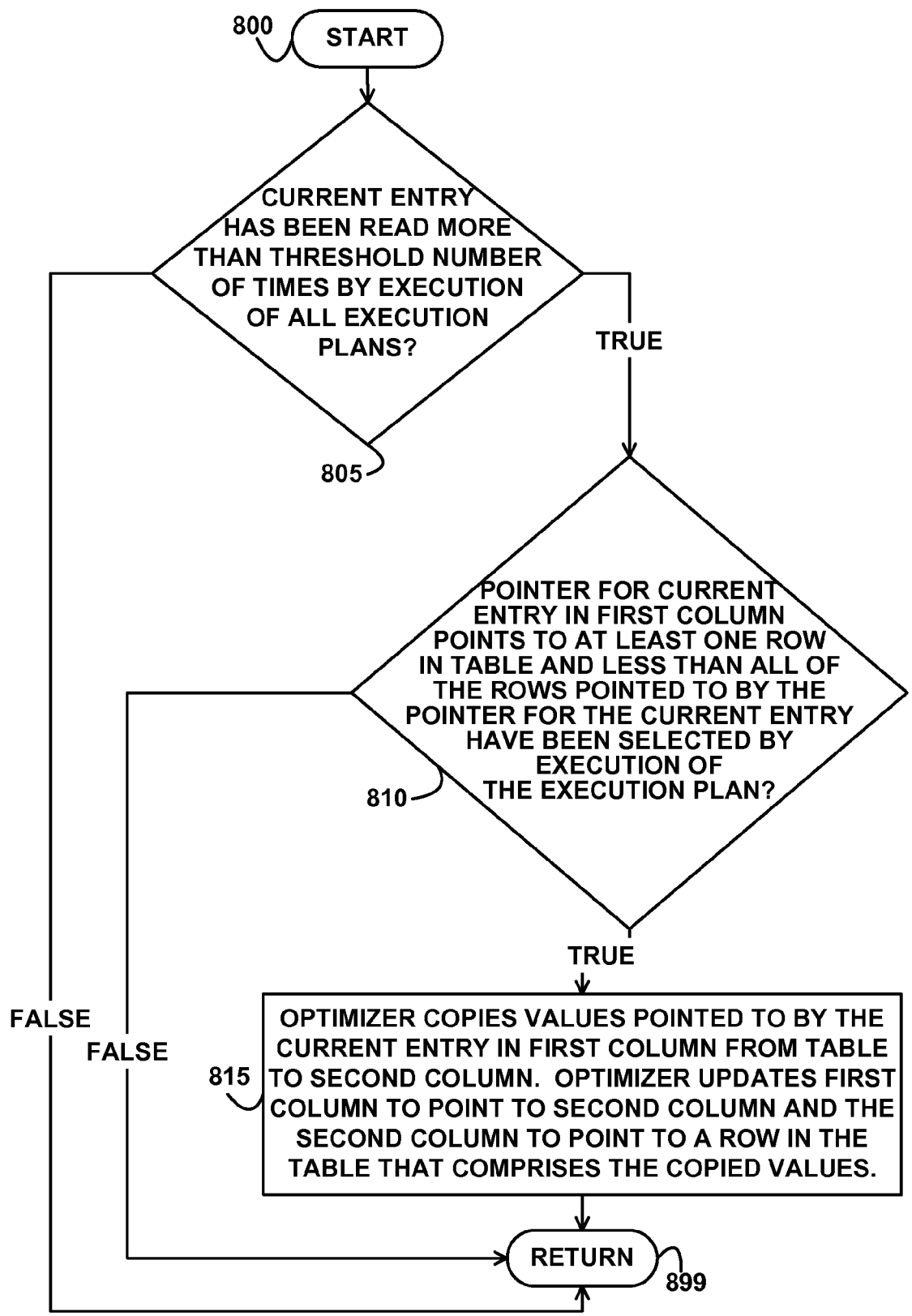
FIG. 8 depicts a flowchart of example processing for evaluating a current entry in an index, according to an embodiment of the invention.

FIG. 8 depicts a flowchart of example processing for evaluating a current entry in an index, according to an embodiment of the invention. Control begins at block 800. Control then continues to block 805 where the optimizer 215 determines whether the current entry in the index 240 was read (in various embodiments, by execution of the currently executing execution plan or by execution of all execution plans) a number of times that is more than the threshold value 242. If the determination at block 805 is true, then the current entry in the index 240 was read more than a threshold number of times by execution of an execution plan 225, so control continues to block 810 where the optimizer 215 determines whether the pointer value in the current entry in the first column of the index points to (contains the address of) at least one row in a table and less than all of the rows pointed to by the pointer for the current entry (in the first column of the index) have been selected for inclusion in the result set 152 by executions of execution plans that implement queries that have read the database, as satisfying the criteria of the query. In various embodiments, the various executions considered by the optimizer at block 810 may be executing the same or different execution plans.

If the determination at block 810 is true, then the pointer value in the current entry in the first column in the index points to (contains the address of) at least one row in a table and less than all of the rows pointed to by the pointer for the current entry in the index have been selected for inclusion in the result set 152 by execution of the execution plan 225, so control continues to block 815 where the optimizer 215 copies data values pointed to by the current entry in the first column in the index from the table to the second column in the index 240. In an embodiment, the pointer value in the current entry in the first column in the index points to (contains the addresses of) a plurality of rows. The optimizer 215 further updates the pointers field in the first column of the current entry to point to the new entry in second column that now contains the copied data values and updates the pointers field in the second column to point to the row in the table 235 that comprises the copied values. By adding more entries to the index 240, in an embodiment, the optimizer 215 may cause execution of an execution plan 225 to perform fewer read operations to the table 235, which may increase performance of the execution of the execution plan 225. Control then continues to block 899 where the logic of FIG. 8 returns to the invoker. In an embodiment, the optimizer 215 creates a new index and modifies the new index with the second column instead of modifying the original index.

If the determination at block 810 is false, then the pointer value in the current entry in the first column of the index points to (contains the address of) an index entry in the second column or all of the rows pointed to by the pointer of the current entry have been selected by execution of the execution plan 225 for inclusion in the result set 152, so control continues to block 899 where the logic of FIG. 8 returns without adding new entries to the index 240.

If the determination at block 805 is false, then the current entry in the index 240 has been read a number of times that is less than or equal to the threshold value 242 by execution of the execution plan or all execution plans, so control continues to block 899 where the logic of FIG. 8 returns without adding new entries to the index 240.

Figure 9:
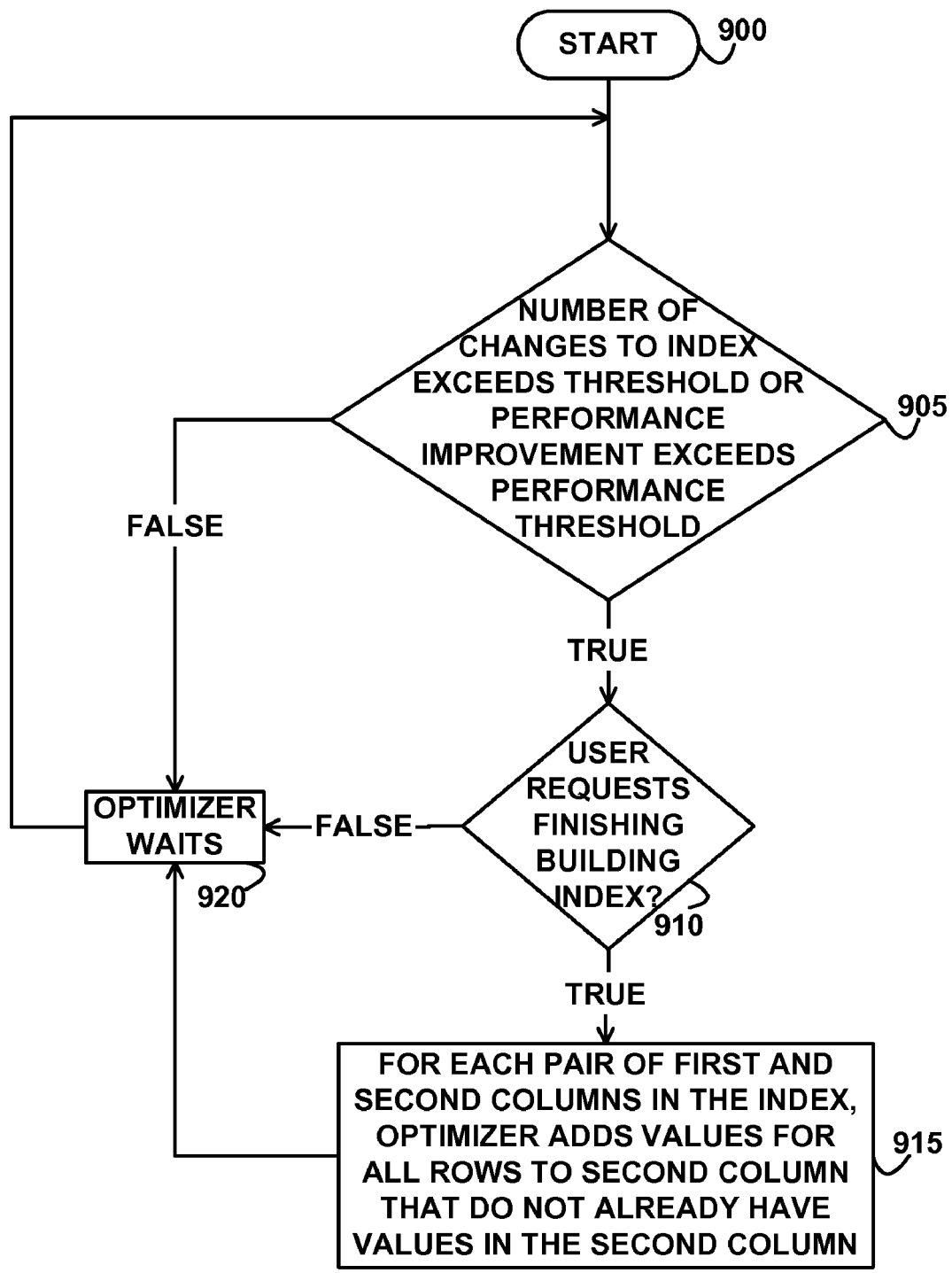
FIG. 9 depicts a flowchart of example processing for adding entries to an index, according to an embodiment of the invention.

FIG. 9 depicts a flowchart of example processing for adding entries to an index, according to an embodiment of the invention. Control begins at block 900. Control then continues to block 905 where the optimizer 215 determines whether the number of changes to the index 240 (made by the logic of FIG. 8) exceeds the threshold 242 or the performance of queries implemented by execution plans that were executed after the changes to the index 240 were made (by the logic of FIG. 8) has improved by more than a performance threshold over performance of the queries implemented by execution plans that were executed before the changes to the index 240 were made (by the logic of FIG. 8).

If the determination at block 905 is true, then the number of changes to the index 240 made by the logic of FIG. 8 exceeds the threshold 242 or the performance of the queries implemented by execution plans executed since the changes to the index 240 were made has improved by more than a performance threshold, so control continues to block 910 where the optimizer 215 asks the user if the user wishes the building of the index 240 to continue or finish. In various embodiments, the optimizer 215 may send a message to the user or present a dialog via a user interface of the user I/O device 121 that gives the user the opportunity to request that the building of the index 240 finish, complete, or continue.

If the determination at block 910 is true, then the user has requested that the building of the index 240 be finished or completed, so control continues to block 915 where the optimizer 215, for each pair of first and second columns in the index 240, adds values for all rows to the second column that do not already have values in the second column. That is, for each current entry in the first column in the index 240, the optimizer 215 copies values pointed to by the current entry in the first column from the table to the second column in the index 240. The optimizer 215 further updates the pointers field in first column of the current entry to point to the entry in the second column that now contains the copied values and updates the pointers field in the second column to point to the row in the table that comprises the copied values. The optimizer 215 then changes the current entry in the first column to the next entry in the first column and continues building the index 240, until the optimizer 215 has processed all entries in the first column.

Control then continues to block 920 where the optimizer 215 waits for a period of time before returning to block 905, as previously described above.

If the determination at block 910 is false, then the user has not requested that the building of the index 240 be finished or complete, so control continues to block 920 where the optimizer 215 waits for a period of time before returning to block 905, as previously described above.

If the determination at block 905 is false, then the number of changes to the index 240 made by the logic of FIG. 8 does not exceed the threshold value 242 and the performance of queries executed since the changes to the index 240 were made has not improved by more than a performance threshold, so control continues to block 920 where the optimizer 215 waits for a period of time before returning to block 905, as previously described above.

In an embodiment, the logic of FIGS. 6, 7, 8, and 9 execute concurrently or asynchronously from each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
calculating a threshold value for a current entry in a first column of an index;
if the current entry has been read a number of times by execution of an execution plan that is more than the threshold value and the current entry comprises an address of at least one row in a table and not all of the at least one row have been selected by the execution plan for inclusion in a result set as satisfying a query that the execution plan implements, adding a new entry to the index;
if the current entry has been read a number of times by execution of an execution plan that is less than or equal to the threshold value, refraining from adding the new entry to the index;
if all of the at least one row have been selected by the execution plan for inclusion in the result set as satisfying the query that the execution plan implements, refraining from adding the new entry to the index; and,
wherein the method is performed by a computing system.

2. The method of claim 1, wherein the adding the new entry to the index comprises:
copying data pointed to by the current entry in the first column from the table to a second column in the index.

3. The method of claim 2, wherein the adding the new entry to the index comprises:
updating the current entry in the first column to point to the new entry in the second column; and
updating the new entry in the second column to point to the data in the table.

4. The method of claim 2, further comprising:
if performance of the execution plan executed after the adding the new entry has improved by more than a performance threshold over performance of the execution plan executed before the adding the new entry, adding values for all rows in the table to the second column in the index that do not already have values in the second column in the index.

5. The method of claim 1, wherein the calculating the threshold value further comprises:
modifying the threshold value in proportion to a selectivity percentage of a number of rows of the table that have been selected for inclusion in the result set.

6. The method of claim 1, wherein the calculating the threshold value further comprises:
modifying the threshold value in proportion to a number of rows in the table pointed to by the current entry.

7. The method of claim 1, wherein the calculating the threshold value further comprises:
modifying the threshold value in proportion to a difference in values of pointers of the current entry that comprise addresses of a plurality of rows in the table.

8. A computer-readable storage medium encoded with instructions, wherein the instructions when executed comprise:
calculating a threshold value for a current entry in a first column of an index;
if the current entry has been read a number of times by execution of an execution plan that is more than the threshold value and the current entry comprises an address of at least one row in a table and not all of the at least one row have been selected by the execution plan for inclusion in a result set as satisfying a query that the execution plan implements, adding a new entry to the index;
if the current entry has been read a number of times by execution of an execution plan that is less than or equal to the threshold value, refraining from adding the new entry to the index; and
if all of the at least one row have been selected by the execution plan for inclusion in the result set as satisfying the query that the execution plan implements, refraining from adding the new entry to the index.

9. The computer-readable storage medium of claim 8, wherein the adding the new entry to the index comprises:
copying data pointed to by the current entry in the first column from the table to a second column in the index.

10. The computer-readable storage medium of claim 9, wherein the adding the new entry to the index comprises:
updating the current entry in the first column to point to the new entry in the second column; and
updating the new entry in the second column to point to the data in the table.

11. The computer-readable storage medium of claim 9, further comprising:
if performance of the execution plan executed after the adding the new entry has improved by more than a performance threshold over performance of the execution plan executed before the adding the new entry, adding values for all rows in the table to the second column in the index that do not already have values in the second column in the index.

12. The computer-readable storage medium of claim 8, wherein the calculating the threshold value further comprises:
modifying the threshold value in proportion to a selectivity percentage of a number of rows of the table that have been selected for inclusion in the result set.

13. The computer-readable storage medium of claim 8, wherein the calculating the threshold value further comprises:
modifying the threshold value in proportion to a number of rows in the table pointed to by the current entry.

14. The computer-readable storage medium of claim 8, wherein the calculating the threshold value further comprises:
modifying the threshold value in proportion to a difference in values of pointers of the current entry that comprise addresses of a plurality of rows in the table.

15. A computer comprising:
a processor; and
memory communicatively coupled to the processor, wherein the memory is encoded with instructions, and wherein the instructions when executed on the processor comprise
calculating a threshold value for a current entry in a first column of an index,
if the current entry has been read a number of times by execution of an execution plan that is more than the threshold value and the current entry comprises an address of at least one row in a table and not all of the at least one row have been selected by the execution plan for inclusion in a result set as satisfying a query that the execution plan implements, adding a new entry to the index, wherein the adding the new entry to the index comprises copying data pointed to by the current entry in the first column from the table to a second column in the index, updating the current entry in the first column to point to the new entry in the second column, and updating the new entry in the second column to point to the data in the table,
if the current entry has been read a number of times by execution of an execution plan that is less than or equal to the threshold value, refraining from adding the new entry to the index, and
if all of the at least one row have been selected by the execution plan for inclusion in the result set as satisfying the query that the execution plan implements, refraining from adding the new entry to the index.

16. The computer of claim 15, wherein the calculating the threshold value further comprises:
modifying the threshold value in proportion to a selectivity percentage of a number of rows of the table that have been selected for inclusion in the result set.

17. The computer of claim 15, wherein the calculating the threshold value further comprises:
modifying the threshold value in proportion to a number of rows in the table pointed to by the current entry.

18. The computer of claim 15, wherein the calculating the threshold value further comprises:
modifying the threshold value in proportion to a difference in values of pointers of the current entry that comprise addresses of a plurality of rows in the table.

19. The computer of claim 15, wherein the instructions further comprise:
if performance of the execution plan executed after the adding the new entry has improved by more than a performance threshold over performance of the execution plan executed before the adding the new entry, adding values for all rows in the table to the second column in the index that do not already have values in the second column in the index.

* * * * *